US006483816B2

United States Patent
Tsunehara et al.

(10) Patent No.: US 6,483,816 B2
(45) Date of Patent: *Nov. 19, 2002

(54) CDMA COMMUNICATION SYSTEM AND ITS TRANSMISSION POWER CONTROL METHOD

(75) Inventors: Katsuhiko Tsunehara, Yokohama (JP); Takashi Yano, Tokorozawa (JP); Nobukazu Doi, Hachioji (JP); Takaki Uta, Yokohama (JP); Keiji Hasegawa, Higashimurayama (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/818,510

(22) Filed: Mar. 28, 2001

(65) Prior Publication Data

US 2001/0012276 A1 Aug. 9, 2001

Related U.S. Application Data

(63) Continuation of application No. 08/985,281, filed on Dec. 4, 1997.

(30) Foreign Application Priority Data

Dec. 6, 1996 (JP) .............................................. 8-326493

(51) Int. Cl.[7] .......................... H04B 7/185; H04B 7/216
(52) U.S. Cl. .......................... 370/318; 370/335; 455/69
(58) Field of Search ................................ 370/310, 318, 370/335, 320, 322, 324, 328, 329, 342; 455/69, 68, 70, 115, 432, 522, 134; 379/318

(56) References Cited

U.S. PATENT DOCUMENTS

| 5,559,790 | A |   | 9/1996 | Yano et al. .................. 370/342 |
| 5,604,730 | A |   | 2/1997 | Tiedemann, Jr. ............. 370/252 |
| 5,621,723 | A | * | 4/1997 | Walton et al. ............... 370/335 |
| 5,673,259 | A |   | 9/1997 | Quick, Jr. .................... 370/342 |
| 5,713,074 | A |   | 1/1998 | Hulbert ........................ 455/69 |
| 5,784,360 | A |   | 7/1998 | I et al. ........................ 370/252 |
| 5,794,129 | A |   | 8/1998 | Komatsu ...................... 455/69 |

(List continued on next page.)

FOREIGN PATENT DOCUMENTS

| WO | 95/31879 | 11/1995 |
| WO | 96/03813 | 2/1996 |

OTHER PUBLICATIONS

"Development on CDMA Packet Mobile Communication System," by Yano et al, Communication Society Meeting, Institue of Electronics, Information and Communication Engineers, B–389 (1996).

*Primary Examiner*—Hassan Kizou
*Assistant Examiner*—Saba Tsegaye
(74) *Attorney, Agent, or Firm*—Mattingly, Stanger & Malur, P.C.

(57) ABSTRACT

An uplink channel transmission power control method is provided for a CDMA mobile communication system performing one way communication. A base station measures the received level of data transmitted from each mobile terminal at each channel, and generates a transmission power control signal of each uplink traffic channel. The generated transmission power control signals are multiplexed, and the multiplexed common transmission power control signal is transmitted to all mobile terminals by using the common channel shared by the mobile terminals. Each mobile terminal derives the transmission power control signal of the uplink traffic channel used by the terminal, from the received common transmission power control signal, and controls the transmission power of a data packet.

6 Claims, 10 Drawing Sheets

U.S. PATENT DOCUMENTS

| | | | |
|---|---|---|---|
| 5,799,005 A | | 8/1998 | Soliman ..................... 370/335 |
| 5,812,938 A | * | 9/1998 | Gilhousen et al. .......... 455/517 |
| 5,818,829 A | * | 10/1998 | Raith et al. ................. 370/347 |
| 5,828,662 A | * | 10/1998 | Jalali et al. ................. 370/335 |
| 5,991,627 A | | 11/1999 | Honkasalo et al. ......... 455/437 |
| 5,995,496 A | | 11/1999 | Honkasalo et al. ......... 370/318 |
| 6,195,046 B1 | * | 2/2001 | Gilhousen ................... 342/457 |
| 6,226,316 B1 | * | 5/2001 | Schilling et al. ............ 375/142 |

* cited by examiner

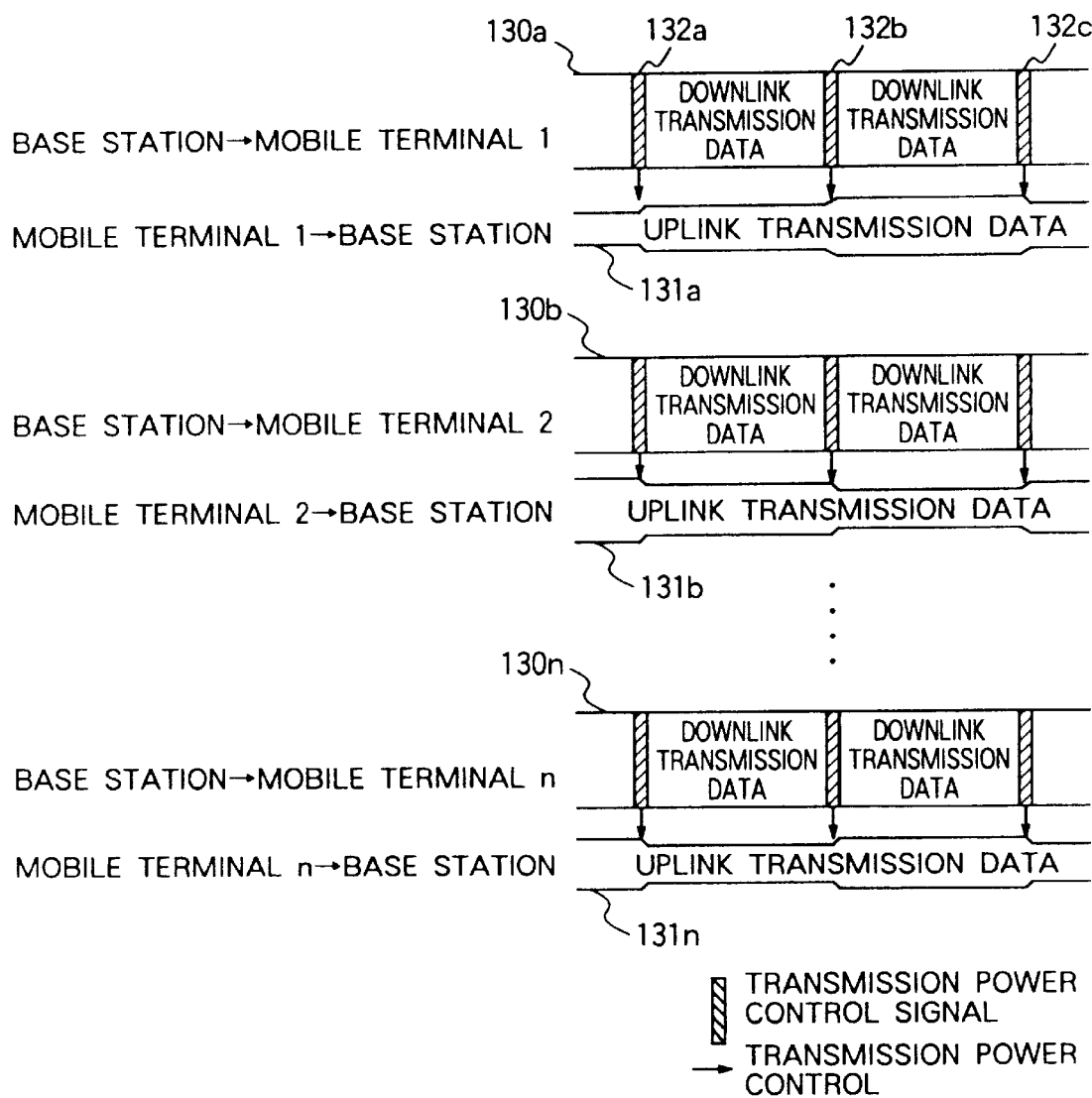

CDMA COMMUNICATION SYSTEM AND ITS TRANSMISSION POWER CONTROL METHOD

This application is a continuation application of U.S. Ser. No. 08/985,281, filed Dec. 4, 1997.

BACKGROUND OF THE INVENTION

The present invention relates to a code division multiple access mobile communication system and its transmission power control method. More particularly, the present invention relates to a packet communication system and its transmission power control method using reservation based access control.

In a CDMA method, a plurality of mobile terminals share the same frequency band to communicate with a single base station. Therefore, for example, if mobile terminals A and B transmit modulated signal waves to the base station, the signal (not desired to be received) transmitted by the mobile terminal B interferes with the signal (desired to be received) transmitted by the mobile terminal A, and the communication of the mobile terminal A with the base station is obstructed. The degree of interference depends on the received level of a signal (not desired to be received) at the base station. If the degree of interference becomes large to some level or more, communication between the mobile terminal and base station becomes impossible.

If the transmission power of each mobile terminal can be controlled to always limit the signal level received at the base station to a minimum necessary reception power, it becomes possible to maximize the number of channels capable of being communicated by the base station. The more the transmission power shifts from the minimum necessary reception power, the less the number of channels capable of being communicated by the base station.

As transmission power control techniques of CDMA mobile communication, an IS-95 transmission power control method is known and described in TIA/EIA/IS-95 which is a standard system of digital cellular phones adopted in North America. The IS-95 transmission power control method will be described in the following.

Since two way communication is essential for cellular phones, a pair of an uplink traffic channel and a downlink traffic channel is used for the communication between the base station and a mobile terminal. The uplink traffic channel is a channel for transmitting data from a mobile terminal to the base station, and a downlink traffic channel is a channel for transmitting data from the base station to the mobile terminal.

The base station measures the reception power of data transmitted from each mobile terminal and generates a transmission power control signal in accordance with the measured reception power. If the reception power of data is larger than a target reception power, the base station generates a transmission power control signal "1" for this mobile station. Conversely if the reception power of data is smaller than the target reception power, the base station generates a transmission power control signal "0" for this mobile station. The generated transmission power control signal is inserted into data to be transmitted from the base station to a mobile terminal, and the transmission data with the transmission power control signal is transmitted to the mobile terminal. The mobile terminal controls to reduce the transmission power if the received transmission power control signal is "1", and to increase it if "0".

This transmission power control will be described specifically with reference to FIG. 12. Each mobile terminal 1 to n and the base station communicate with each other by using a pair of an uplink traffic channel and a downlink traffic channel. The upper row of each pair represents transmission data of the downlink traffic channel, and the lower row represents transmission data of the uplink traffic channel. The width of transmission data, particularly uplink transmission data, is drawn to correspond to a reception power of the uplink data at the base station.

When the base station communicates with the mobile terminal 1, it inserts transmission power control signals 132a, 132b, 132c, . . . into a downlink traffic channel 130a to the mobile terminal 1. The mobile terminal 1 changes its transmission power of the uplink transmission data in accordance with the transmission power control signal obtained from the received channel 130a. As above, the transmission power control of the mobile terminal 1 is performed by using the downlink traffic channel 130a. Similar transmission power control is performed also for other mobile terminals 2 to n.

SUMMARY OF THE INVENTION

With advancement of mobile communication techniques, needs of not only a voice communication function (cellar phone) but also a data communication function are becoming large.

For one way communication typical to data communication, CDMA packet communication systems have been proposed from the viewpoint of efficiently using channels. One proposal of such CDMA packet communication systems is described in "Development on CDMA Packet Mobile Communication System" by Yano, Uta, Hasegawa, and Doi, Communication Society Meeting, the Institute of Electronics, Information and Communication Engineers, B-389 (1996).

Voice communication is two way communication using uplink and downlink traffic channels, whereas data communication is one way communication using only one of uplink and downlink traffic channels. In such one way communication, a conventional transmission power control method for cellular phones cannot be adopted because this method is established on the assumption that there is one pair of uplink and downlink traffic channels.

If a paired downlink channel is provided only for the transmission power control of the uplink traffic channel, one downlink traffic channel is occupied by the transmission power control of only the uplink traffic channel. The use efficiency of traffic channels is lowered.

To solve this problem, the invention provides a CDMA packet data communication system in which a base station controls the transmission power of each of a plurality of mobile terminals by using a single downlink traffic channel common for all mobile stations.

The base station measures the received level of data transmitted from each mobile terminal at each channel, and generates a transmission power control signal of each channel in accordance with the measured reception level. The generated transmission power control signals are collected together into a format predetermined for the system, and transmitted to all mobile terminals by using the common channel shared by the mobile terminals.

Each mobile terminal derives the transmission power control signal of the uplink traffic channel used by the terminal, from the collected transmission power control signals transmitted from the base station, and transmits data at the transmission power changed in accordance with the derived transmission power control signal.

BRIEF DESCRIPTION OF THE DRAWINGS

FIG. 12 is a diagram illustrating an uplink traffic channel transmission power control method of a conventional portable telephone system.

DETAILED DESCRIPTION OF THE PREFERRED EMBODIMENTS

Figure 1:
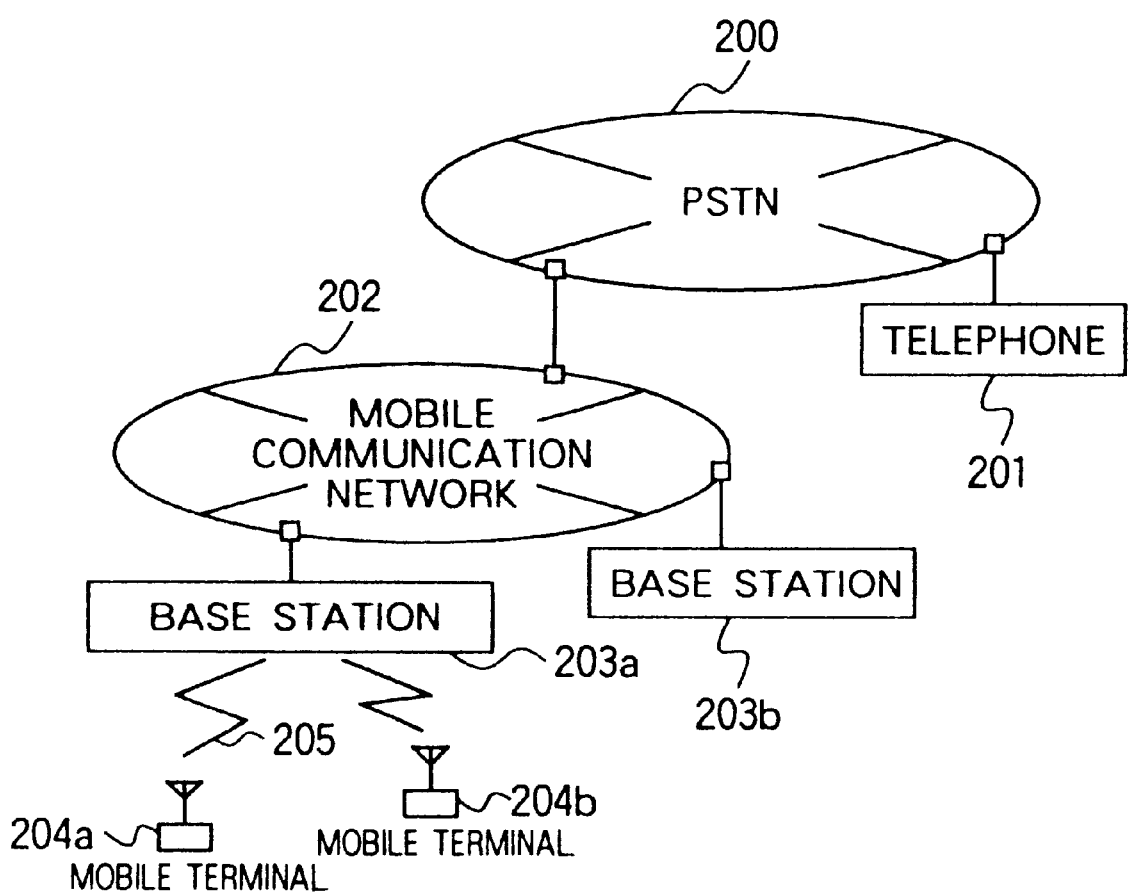
FIG. 1 is a diagram showing the structure of a mobile communication network.

FIG. 1 shows the structure of a mobile communication network applied to the present invention. A public switched telephone network (PSTN) 200 is connected with a fixed terminal 201 such as a telephone and a mobile communication network 202. The mobile communication network 202 is connected with a plurality of base stations 203*a*, 203*b*, . . . . Each base station 203 communicates with mobile terminals 204*a*, 204*b*, . . . in its service area (cell) via radio channels 205.

In the following, the invention will be detailed by applying it to a CDMA packet communication system using reservation based access control shown in FIG. 2.

In the CDMA packet communication system using reservation based access control, channels shared by a plurality of mobile terminals in the service area include a reservation channel 1 (uplink channel), an answer channel 2 (downlink channel) and a pilot channel 8 (downlink channel). The pilot channel 8 is a channel used for transmitting a pilot signal 9 as a reference signal to each mobile terminal.

A mobile terminal having a data transmission request transmits a reservation packet 4 at a desired timing by using the reservation channel 1. The base station performs scheduling of received reservation packets. The base station selects (schedules) a channel and a time slot (a time slot 7 is defined in an uplink traffic channel 3) via which each mobile terminal can transmit data, from a plurality of uplink traffic channels 3. In order to transmit the scheduling results to each mobile terminal, the base station generates an answer packet 5 corresponding to the reservation packet. The generated answer packet 5 is transmitted to the corresponding mobile terminal in the area by using the answer channel 2. The mobile terminal identifies the answer packet destined to it from received answer packets 5, and transmits a data packet by using the uplink traffic channel and time slot designated by the base station.

Figure 2:
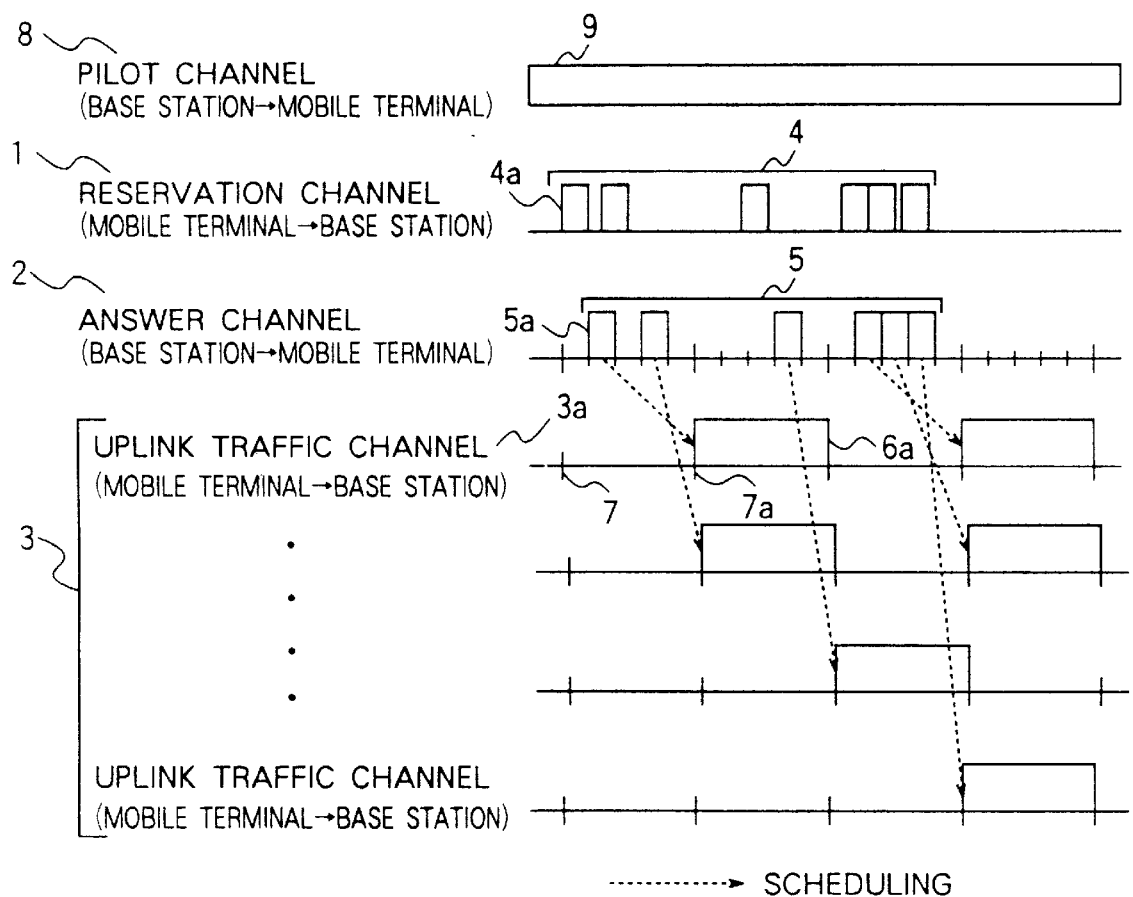
FIG. 2 is a diagram illustrating a packet data communication system using reservation based access control.

In the example shown in FIG. 2, the mobile terminal transmitted the reservation packet 4*a* receives the answer packet 5*a* transmitted to it, selectively from answer packets transmitted from the base station, and transmits a data packet 6*a* by using the time slot 7*a* of the traffic channel 3*a* designated in the received answer packet 5*a*.

With reference to FIGS. 3 to 9, a first embodiment will be described which realizes a method of controlling the transmission power of an uplink channel.

Figure 3:
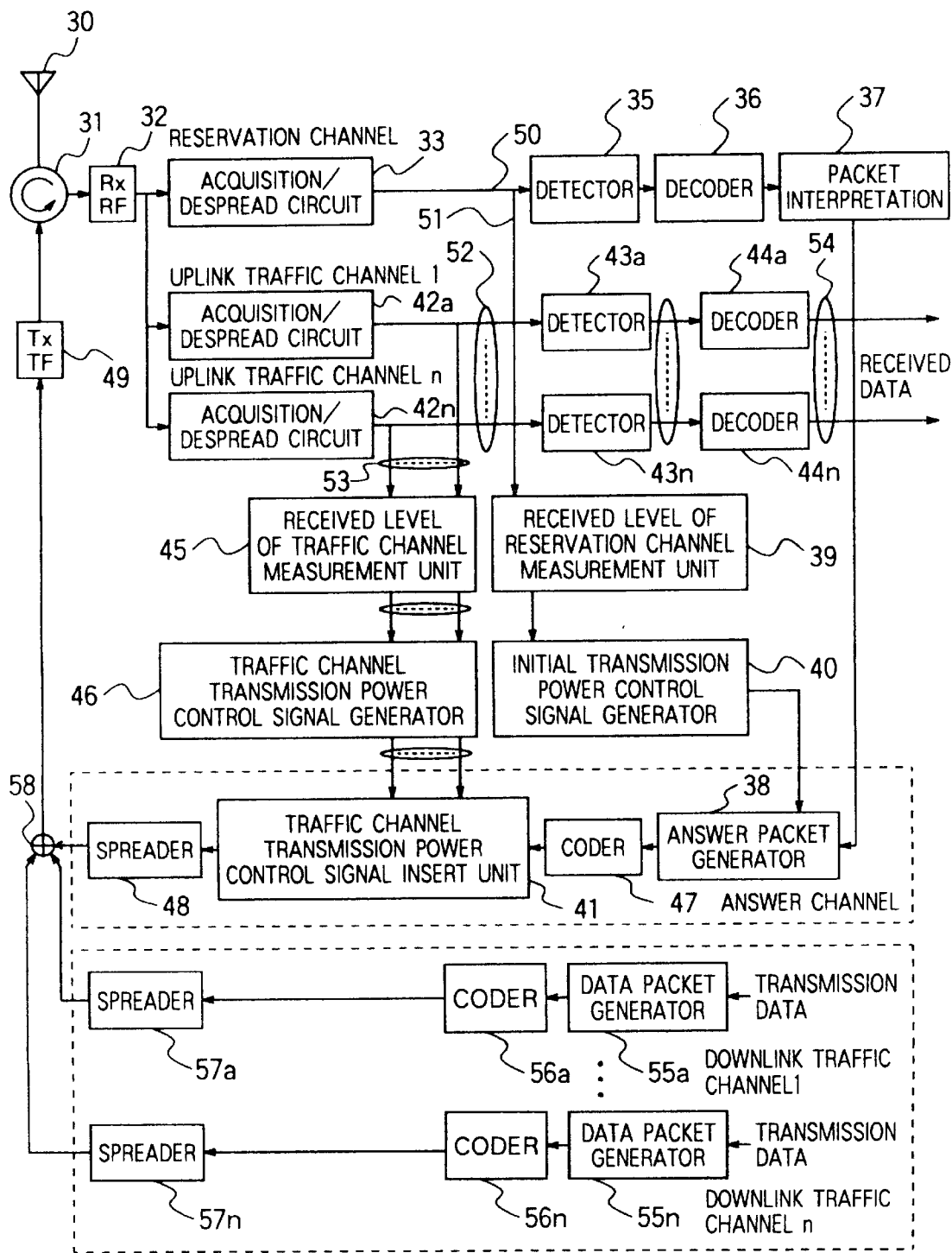
FIG. 3 is a diagram showing a first example of the structure of a base station embodying transmission power control of the-present invention.

FIG. 3 shows an example of the structure of a base station. A signal received by an antenna 30 is input via a circulator 31 to a reception radio module 32. The reception radio module 32 performs a high/middle frequency reception process to demodulate a signal in a carrier frequency band into a baseband signal. Since the received signal has a plurality of multiplexed channel signals, it is input to an acquisition/despread circuit (33, 42*a*–42*n*) to be spectrum despread.

A reservation channel output from the reservation channel acquisition/despread circuit 33 is supplied via a signal line 50 to a detector 35 whereat it is detected and then supplied to a decoder 36 whereat an error correction decode process such as Viterbi decoding is performed. A packet interpretation unit 37 interprets the decoded reservation packet to obtain a terminal ID of the mobile terminal which transmitted the reservation packet and the reservation contents such as transmission data, and transfers the reservation contents to an answer packet generator unit 38.

The reservation packet is also input via a signal line 51 to a unit 39 for measuring the received level of the reservation channel. This unit 39 measures a signal to noise power ratio (SN ratio) of the reservation packet. The measurement result of the received level is compared with a reference reception level by an initial transmission power control signal generator 40. In accordance with this comparison result, a transmission power control signal is generated which designates a transmission power when the mobile terminal starts transmitting a data packet. The generated transmission power control signal is input to an answer packet generator 38.

Figure 4:
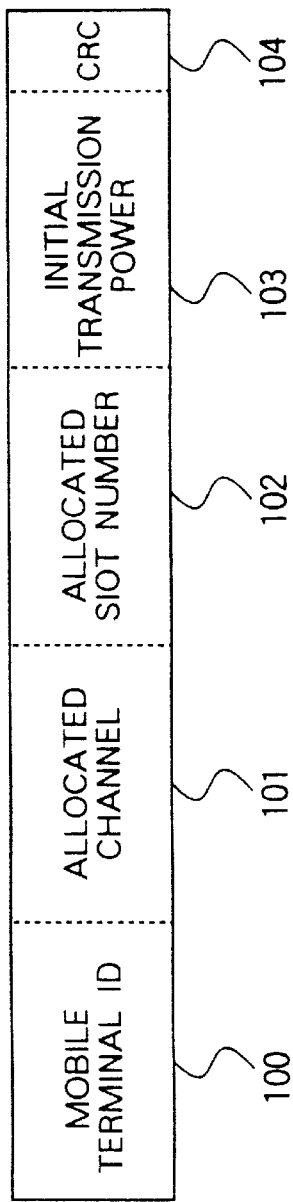
FIG. 4 is a diagram showing the structure of an answer packet.

In accordance with the reservation contents interpreted by the packet interpretation unit 37 and the transmission power control signal generated by the initial transmission power control signal generator 40, the answer packet generator 38 generates an answer packet. An example of the structure of an answer packet is shown in FIG. 4. A mobile terminal ID is an ID of a mobile terminal which transmitted a reservation packet. This ID is used as a destination of the answer packet. An allocated channel 101 and an allocated slot number 102 indicate an uplink traffic channel and a time slot to be used by the mobile terminal and are designated by the answer packet generator 38. An initial transmission power 103 indicates a transmission power when the mobile terminal starts transmitting data and is designated by the transmission power control signal input from the initial transmission power control signal generator 40. This initial transmission power control signal may designate an increase/decrease relative to the transmission power when the reservation packet was transmitted, or may be an absolute value (increased/decreased value) of the transmission power, whichever of them is determined by the system. A CRC (Cyclic Redundancy Check) 104 is a code added to the answer packet for error detection/correction.

The answer packet generated in the above manner is input to a coder 47 whereat an error correction coding such as convolutional coding is performed. The coded answer packet is input to a unit 41 for inserting a traffic channel transmission power control signal.

The other acquisition/despread circuits 42a to 42n provided for a plurality of uplink traffic channels each output a data packet transmitted via each uplink traffic channel. The data packet of each channel is supplied via a signal line 52 to a detector 43a–43n and a decoder 44a to 44n to be detected and decoded, and the reception data is output from a signal line 54.

Figure 5:
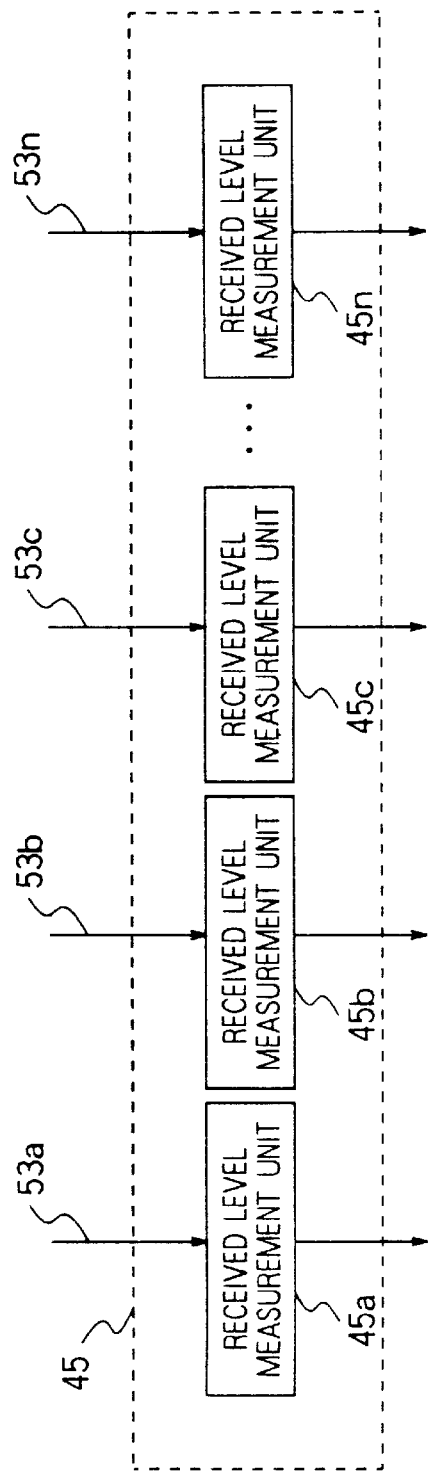
FIG. 5 is a diagram showing the structure of a unit for measuring a received level of a traffic channel.

The data packet is also supplied via a signal line 53 to a unit 45 for measuring the received level of the traffic channel. The structure of this unit 45 is shown in FIG. 5. The received level measurement units 45a to 45n corresponding to the uplink traffic channels 53a to 53n measure the received level such as an SN ratio.

Figure 6:
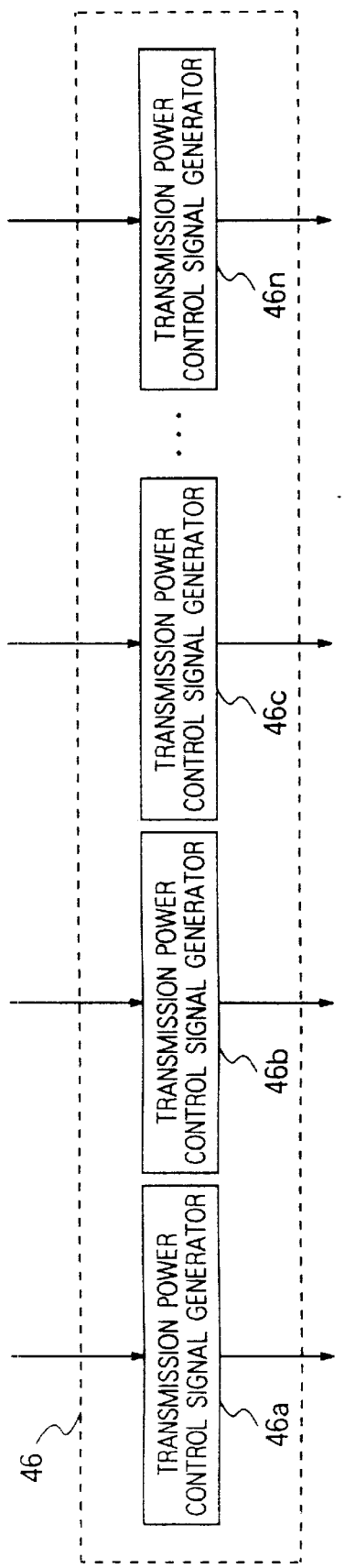
FIG. 6 is a diagram showing the structure of a unit for generating a transmission power control signal of a traffic channel.

The received level measurement result of each traffic channel is input to a traffic channel transmission power control signal generator 46. The structure of the generator 46 is shown in FIG. 6. Each of the transmission power control signal generators 46a to 46n provided for each uplink traffic channel compares the received level with a target reception level, and generates a transmission power control signal for making the mobile terminal renew the transmission power when it continues data transmission. Similar to the initial transmission power control signal, this renewal designation transmission power control signal is determined by the system. The generated transmission power control signal is input to the unit 41 for inserting the traffic channel transmission power control signal.

Figure 7:
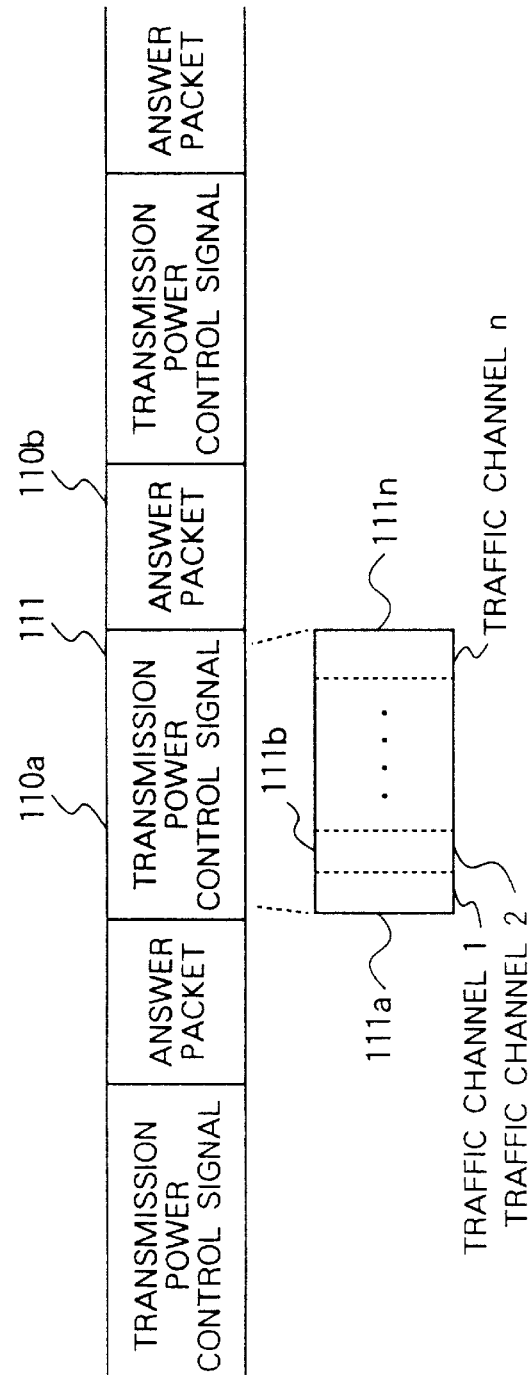
FIG. 7 is a diagram illustrating insertion of a transmission power control signal between answer packets.

As shown in FIG. 7, the traffic channel transmission power control signal insert unit 41 inserts a common transmission power control signal 111 generated by the traffic channel transmission power control signal generator 46 at a predetermined interval between answer packets 110 input from the answer packet generator 38. The common transmission power control signal 111 is constituted of transmission power control signals 111a to 111n of respective traffic channels 1 to n.

In order to suppress a fluctuation of the received level of a data packet, the base station is required to perform a transmission power control of each mobile terminal at a sufficiently high occurrence frequency. The data packet is made of several tens of bits to allow information of some amount to be transmitted at the same time. In contrast, the common transmission power control signal 111 can be made of n bits assuming the same system as IS-95. As shown in FIG. 4, the answer packet can be made sufficiently small relative to the size of a data packet. Therefore, as in this embodiment, even if the answer channel and the transmission power control channel are shared, the transmission power control can be performed at a sufficiently high occurrence frequency. If the answer packet and the common transmission power control signal are received by the same channel, the mobile terminal can use a common receiver both for the answer packet and common transmission power control signal. In this manner, the circuit scale of each mobile terminal can be made small.

It is also possible to transmit the common transmission power control signal at a transmission power larger than that of the answer packet in order to reliably perform the transmission power control.

The answer packet and common transmission power control signal are spectrum spread by a spreader 48 for answer channel. The spectrum spread answer packet and common transmission power control signal are multiplexed with other downlinks by an adder 58, modulated from the baseband signal into a signal in the carrier frequency band by a transmission radio module 49, and transmitted from the antenna 30 via the circulator 31.

Figure 8:
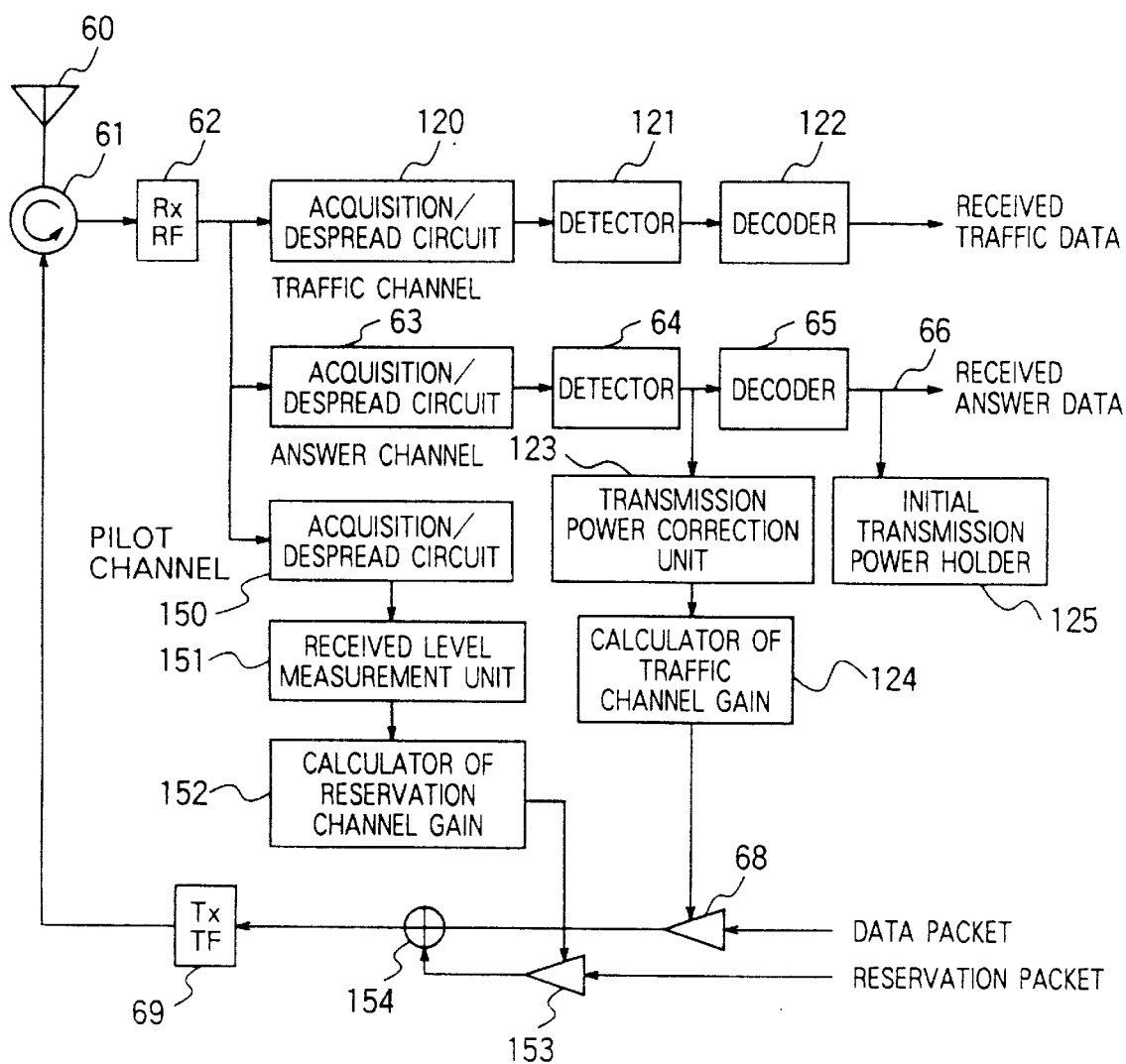
FIG. 8 is a diagram showing a first example of the structure of a mobile terminal embodying the transmission power control of the invention.

An example of the structure of a mobile terminal is shown in FIG. 8.

The operation of transmitting a reservation packet from a mobile terminal will be described.

A signal received by an antenna 30 is input via a circulator 61 to a reception radio module 62. The reception radio module 62 performs a high/middle frequency reception process to demodulate a signal in the carrier frequency band into a baseband signal. A pilot signal output from an acquisition/spread circuit 150 for a pilot channel is input to a unit 151 for measuring a received level. This unit 152 measures the received level (e.g., SN ratio) of the pilot signal. The measurement result of the received level is input to a reservation channel gain calculator 152 which determines the transmission power of a reservation packet in accordance with the received level of the pilot signal.

In the mobile communication system provided with independent pilot channels, the pilot signal is transmitted from the base station always at a constant transmission power level. Therefore, if an SN ratio of the received pilot signal is large, it is conceivable that the mobile terminal is near at the base station so that the reservation channel gain calculator 152 calculates a small gain. Conversely, if an SN ratio of the received pilot signal is small, it is conceivable that the mobile terminal is far from the base station so that the reservation channel gain calculator 152 calculates a large gain. In order to determine the transmission power of a reservation packet in the above manner, another signal different from the pilot signal may be used so long as it allows the mobile terminal to know the transmission power of the base station. For example, the pilot signal whose transmission power is determined by the system or a control signal transmitted with the transmission power value can satisfy the above conditions.

Next, an operation will be described in which a mobile terminal that transmitted a reservation packet to the base station receives an answer packet transmitted from the base station.

An answer packet output from the despread circuit 63 for an answer channel is detected with a detector and subjected to an error correction/decode process such as Viterbi decoding. With the above processes, it becomes possible to obtain the information of an allocated traffic channel and an allocated time slot contained in the answer packet. An initial transmission power holder 125 holds an initial transmission power signal contained in the answer packet, and inputs the initial transmission power signal to a data channel gain calculator 124 which calculates a gain so that a data packet can be transmitted at a transmission power designated by the initial transmission power signal. The calculated gain is set as the gain of a variable gain amplifier 68.

The data packet transmitted from the mobile terminal is amplified by the variable gain amplifier 68 at the gain designated by the data channel gain calculator 124. The amplified signal is modulated from the baseband signal into a signal in the carrier frequency band by a transmission radio module 69 and transmitted from the antenna 60 via the circulator 61.

Next, transmission power control while a mobile terminal transmits a data packet to the base station will be described.

A transmission power correction unit 123 derives the common transmission power control signal from a signal of the answer channel processed by the answer channel acquisition/despread circuit 63 and detector 64. The transmission power correction unit 123 selects a transmission power control signal of the uplink traffic channel now in use by its mobile terminal, from the common transmission power control signal. For example, in the example shown in FIG. 7, the mobile terminal transmitting a data packet by using the transmission channel 1 selects its transmission power control signal 111*a*. The selected transmission power control signal is input to the gain calculator 124 which calculates a gain so that a data packet can be transmitted at a transmission power designated by the transmission control signal, and thereafter renews the gain of the variable gain amplifier 68. The amplified signal is modulated by the transmission radio module 69 from the baseband signal into a signal in the carrier frequency band, and transmitted from the antenna 60 via the circulator 61.

Figure 9:
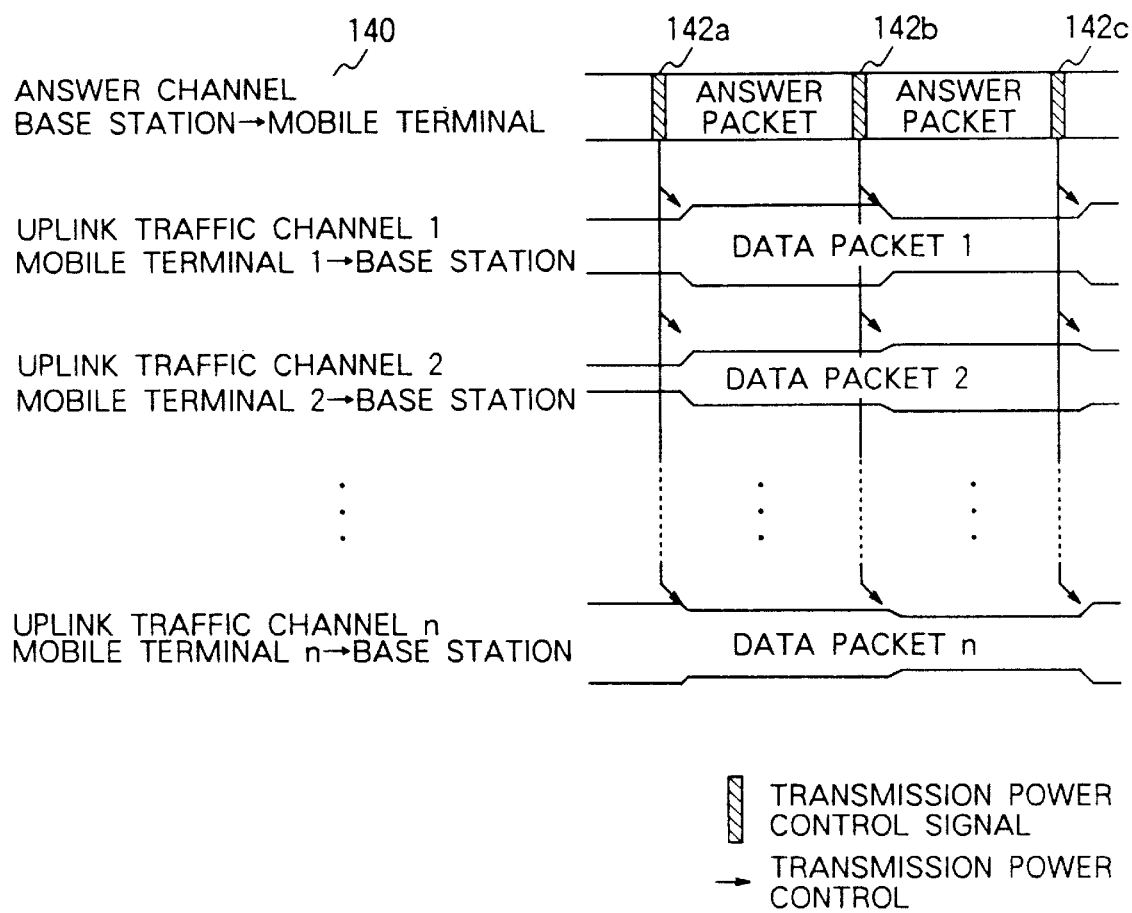
FIG. 9 is a diagram illustrating a transmission power control state of an uplink traffic channel realized by the operations of a base station and mobile terminals according to the present invention.

FIG. 9 illustrates the state of transmission power control realized by the above operations of the base station and a mobile terminal.

The base station inserts common transmission power control signals 142*a*, 142*b*, 142*c*, . . . into a common answer channel shared by mobile terminals in the area and transits them. The common transmission power control signal 142 contains transmission power control signals for the respective traffic channels 1 to n. Each of the mobile terminals 1 to n transmitting data packets 1 to n to the base station derives the transmission power control signal of the traffic channel now in use by the mobile terminal, from the common transmission power control signals 142*a*, 142*b*, 142*c*, . . . In accordance with the derived transmission power control signal, the mobile terminal changes the transmission power of the data packet.

In the state shown in FIG. 9, the width of a data packet is drawn to correspond to the receive level of the data packet at the base station. For example, in the uplink traffic channel 1, the mobile terminal controls the transmission power such that the transmission powers are increased, reduced, and increased in response to the reception of the common transmission power control signals 142*a*, 142*b*, and 142*c*.

While a data packet is not transmitted by a mobile station, the transmission power control signal is neglected. The transmission power control signal is also neglected if it is received before a lapse time (called "control delay time") necessary for measuring the received level of a data packet at the base station after the mobile terminal transmitted the data packet. The reason for this is a possibility that the transmission power control information received before the lapse of the control delay time may be the transmission power control information of a data packet transmitted by another mobile terminal, resulting in erroneous control to be made.

With the above operations, it becomes possible for the base station to perform transmission power control of the uplink traffic channels 1 to n by using the common control channel shared by the mobile terminals.

This first embodiment has the structure suitable for data communication, particularly for one way data communication. Two way data communication is performed in some case. In this case, the transmission power control signal may be contained in data of a downlink traffic channel. In the following, a mobile communication system of the second embodiment will be described which is suitable for two way communication and has a simple circuit structure, particularly of a mobile terminal.

Figure 10:
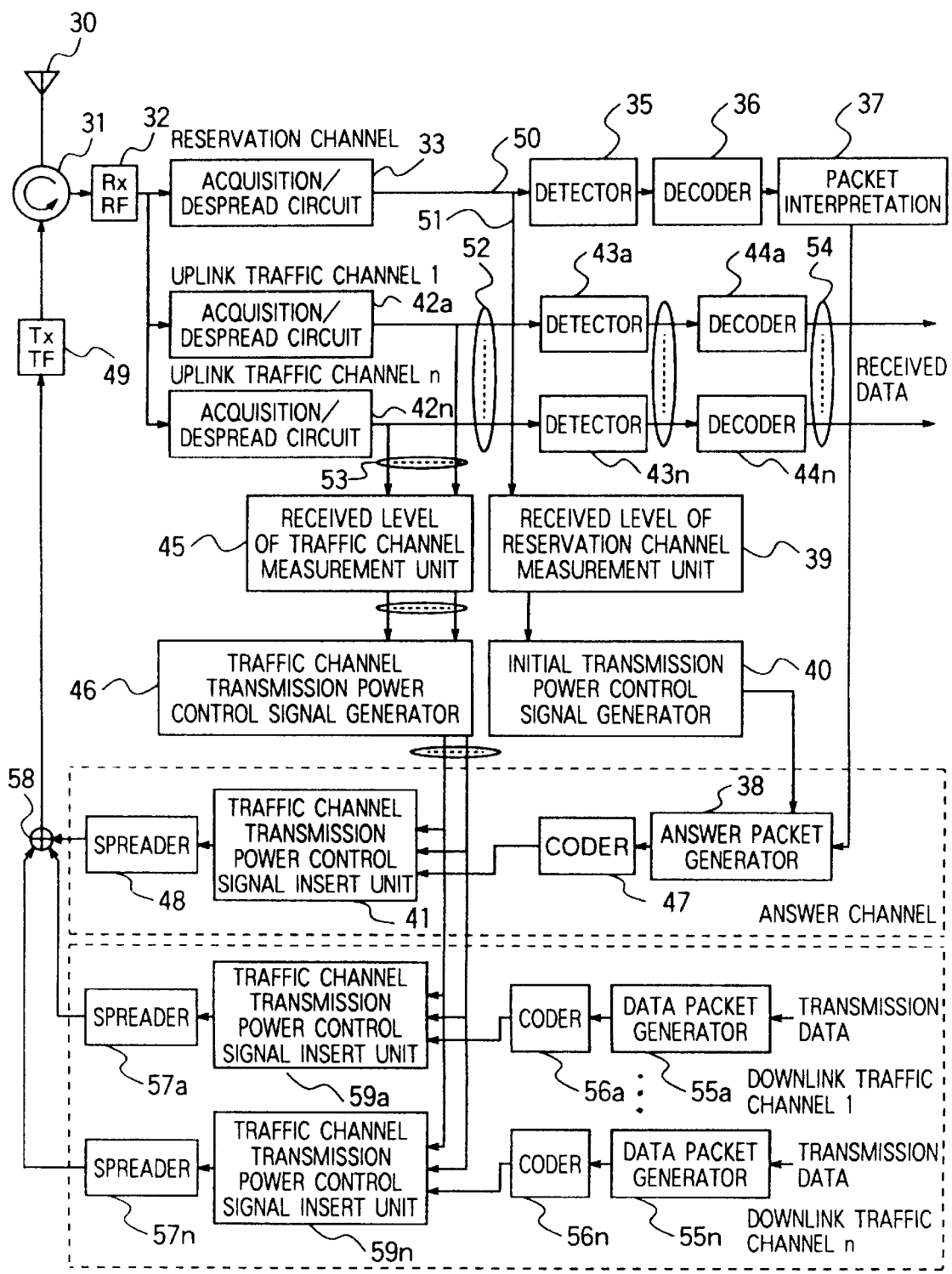
FIG. 10 is a diagram showing a second example of the structure of a base station embodying the transmission power control of the invention.

FIG. 10 shows an example of the structure of a base station according to the second embodiment.

In FIG. 10, like constituent elements to those of the base station of the first embodiment are represented by identical reference numerals. The operation of the base station when a reservation packet is received is similar to the first embodiment.

The base station operates in the manner similar to the first embodiment to decode a received data packet and obtain reception data from the signal line 54. The unit 45 for measuring the received level of a traffic channel and the traffic channel transmission power control signal generator 46 generate transmission power control signals of respective uplink traffic channels.

In the second embodiment, if a mobile terminal transmits and receives a data packet to and from the base station by using an uplink traffic channel i and a downlink traffic channel k, the base station inputs the transmission power control signal of the uplink traffic channel i to the traffic channel transmission power control signal insert unit 59 of the downlink traffic channel k to insert the transmission power control signal into the data packet.

The operation will be detailed by taking as an example the case wherein the base station transmits a data packet by using a downlink traffic channel n to a mobile terminal which transmits a data packet to the base station by using an uplink traffic channel 1. In this case, the transmission power control signal of the uplink traffic channel 1 generated by the traffic channel transmission power control signal generator 46 is input to a traffic channel transmission power control signal insert unit 59*n* of the downlink transmission channel n. The traffic channel transmission power control signal insert unit 59*n* inserts the transmission power control signal in the data packet. This data packet is spectrum spread by the spreader 57*n* and multiplexed with other channel signals by the adder 58. The multiplexed signal is modulated by the transmission radio module 49 from the baseband signal into a signal of the carrier frequency band, and transmitted from the antenna 30 via the circulator 31.

Figure 11:
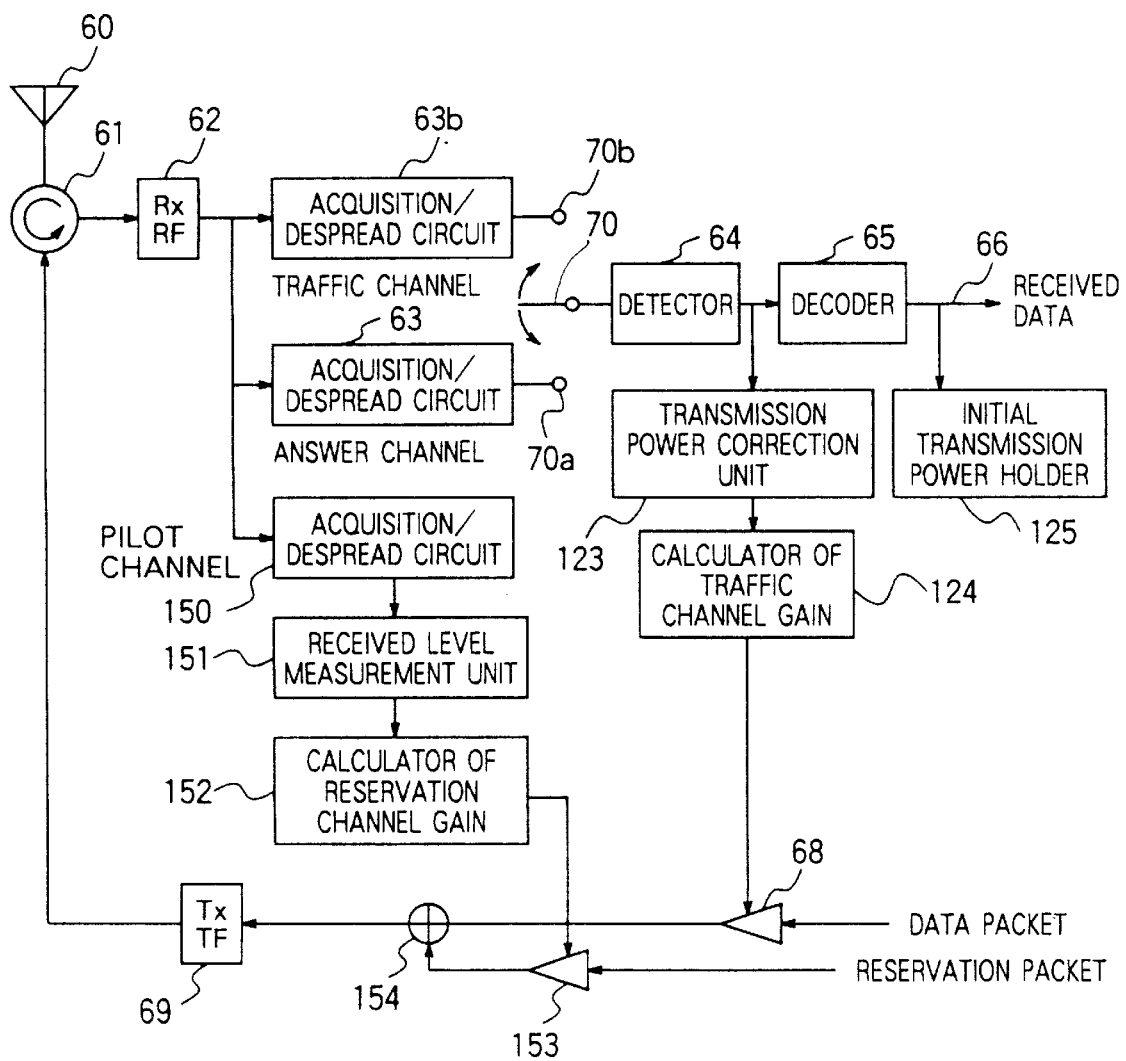
FIG. 11 is a diagram showing a second example of the structure of a mobile terminal embodying the transmission power control of the invention.

An example of a mobile terminal of the second embodiment is shown in FIG. 11.

In FIG. 11, like constituent elements to those of the mobile terminal of the first embodiment shown in FIG. 8 are represented by identical reference numerals. A switch 70 is connected to 70*a* to perform similar operations to the first embodiment, if the mobile terminal transmits a reservation packet, receives an answer packet transmitted from the base station, or only transmits a data packet to the base station (one way communication).

Next, an operation (two way communication) will be described in which a mobile terminal transmits and receives a data packet to and from the base station. In this case, the switch 10 is turned to the 70*b* side.

A data packet is received via the antenna 60, circulator 61 and reception radio module 62, and subjected to a reception process by the traffic channel acquisition/despread circuit 63*b* and detector 64. The data packet output from the detector is subjected to error correction/decoding by the decoder 65 to obtain reception data from the signal line 66. The data packet is also input to the transmission power correction unit 123 which derives the transmission power control signal inserted in the data packet and inputs it to the traffic channel gain calculator 124. The traffic channel gain calculator 124 calculates a gain of the variable gain amplifier 68 to renew the gain, similar to the first embodiment.

With the base station and mobile terminals having the above structures and operating in the above manner, it becomes possible for a mobile terminal to perform transmission/reception of a data packet to/from the base station and reception of transmission power control by the base station, by using either the answer channel or traffic channel. Therefore, it is sufficient if only the mobile terminal has one set of a detector and a decoder, and so the circuit scale of the mobile terminal can be prevented from becoming large.

In the above embodiments, the invention has been applied to a mobile communication system of a reservation based access control scheme in which a base station transmits a transmission power control signal to each mobile terminal by using an answer channel. The invention is also applicable to a channel other than the answer channel if it is a common channel shared by mobile terminals. Namely, if a system uses a common channel shared by mobile terminals, the base station can perform transmission power control of a plurality of mobile terminals by transmitting transmission power control signals via the single common channel. Obviously, a channel dedicated to transmission power control may be provided to perform transmission power control of mobile terminals by transmitting transmission power control signals from the base station by using this dedicated channel.

While the present invention has been described above in conjunction with the preferred embodiments, one of ordinary skill in the art would be enabled by this disclosure to make various modifications to this embodiment and still be within the scope nd spirit of the invention as defined in the appended claims.

What is claimed is:

1. A transmission power control method for a CDMA communication system for performing communication by CDMA between a base station and a plurality of mobile terminals, comprising the steps of:

transmitting over uplink traffic channels from said plurality of mobile terminals to said base station;

measuring, by said base station, a reception level of a signal transmitted from each of said plurality of mobile terminals, generating a transmission power control signal for each of said plurality of mobile terminals in accordance with the reception level, spreading said transmission power control signal for each of said plurality of mobile terminals with a common spreader, and transmitting said transmission power control signal for each of said plurality of mobile terminals to each of said plurality of mobile terminals via a common channel shared by said plurality of mobile terminals; and receiving, by each of said plurality of mobile terminals, said transmission power control signal for the mobile terminal.

2. A method according to claim 1, wherein said spreader is used for spread spectrum.

3. A CDMA communication system for performing CDMA communication between a base station and a plurality of mobile terminals via a plurality of channels, wherein:

said plurality of channels include uplink traffic channels for transmitting a data packet from each mobile terminal to said base station, a reservation channel for transmitting a reservation packet representative of a traffic channel allocation request from each mobile terminal said base station, and a common answer channel shared by said plurality of mobile terminals for transmitting packet indicating an uplink traffic channel via which a data packet is transmitted from said base station to each mobile terminal; and a common spreader that spreads a transmission power control signal of each of said uplink traffic channels and transmitting each said spread transmission power control signal via said common answer channel.

4. A system according to claim 3, wherein said spreader is used for spread spectrum.

5. A base station for communicating with a plurality of mobile terminals by CDMA, comprising:

a reception circuit for receiving a data packet transmitted from each of said plurality of mobile terminals, said plurality of mobile terminals transmitting over uplink traffic channels to said base station;

a unit for measuring the reception level of said received data packet;

a generator for generating a transmission power control signal for each of said plurality of mobile terminals in accordance with said measured reception level of said data packet;

a common spreader that spreads said transmission power control signal; and a transmission circuit for transmitting said spread transmission power control signal to each of said plurality of mobile terminals via a common channel shared by said plurality of mobile terminals.

6. A base station according to claim 5, wherein said spreader is used for spread spectrum.

* * * * *